Patented June 6, 1933

1,912,440

UNITED STATES PATENT OFFICE

CHARLES N. FREY, OF NEW YORK, AND ROBERT F. LIGHT, OF BROOKLYN, NEW YORK, ASSIGNORS, BY MESNE ASSIGNMENTS, TO STANDARD BRANDS INCORPORATED, OF DOVER, DELAWARE, A CORPORATION OF DELAWARE

PRODUCTION OF STEROLS

No Drawing.    Application filed March 22, 1928. Serial No. 263,961.

This invention relates to processes of extracting sterols from yeast and other plant and animal products, and more particularly, to processes of extracting sterols, particularly ergosterol, from yeast, and especially from compressed yeast.

A general object of the invention is to provide a process of extracting and recovering such substances in a convenient, efficient and economical manner in a relatively pure form, and with the attainment of yields approximating the theoretical sterol content of the crude substances used.

A more particular object of the invention is to provide a process by which such substances can be separated and recovered without the use of the plurality of extracting solvents and involved procedural steps such as have heretofore been considered necessary.

The sterols comprise a group of fatty substances which are characterized by the fact that they are unsaponifiable, and previous methods of extracting these substances have utilized first either a direct extraction with ether or some other suitable solvent, followed by saponification or a saponifying step and then one or more extraction steps, whereby unsaponifiable constituents are separated from the saponified mass.

By the utilization of the principles of the present invention such substances as compressed yeast can be saponified, and a considerable proportion of the resulting unsaponifiable constituents, composed largely of the sterols, can be separated from the crude substances treated and from the saponifying solution without the use of other extracting substances. This desirable result is accomplished in part by using as the saponifying agent a solution or mixture in which, while hot, the sterols are relatively soluble, and in which, when cooled, the sterols are relatively insoluble. Thus, as will be readily understood, the greater proportion of the unsaponifiable content of the crude materials can be removed therefrom by separating the saponifying liquid while hot and then cooling the same, at which time the sterols will crystallize out and may be readily removed for further purification.

The saponifying agent may also be characterized by the fact that it does not wet the surface of crystallized sterols and its density is such that the sterols, due to their specific gravity and physical properties, are raised toward and will be held at the surface when the liquid is cooled and gently agitated. In this case, if desired, a considerable proportion of the sterol content of the crude materials can be removed after the saponification, and without the necessity of separating the saponifying liquid from the residue, by cooling the entire mass while introducing fine bubbles of air into the bottom of the reaction mixture. This procedure materially decreases the amount of the sterols which would otherwise crystallize in the residue of the crude material and thereby be mechanically held at the bottom of the mixture. It is then necessary only to skim or filter off the crystallized sterols which have thus been brought to the top of the saponifying liquid, whereupon the mass may be reheated and the cycle repeated, with the recovery of further amounts of sterols. A suitable density of the saponifying liquid after treatment is about 0.99 sp. gr.

A saponifying mixture which was found to be particularly well adapted for use in the present process is one composed of alcohol, sodium or potassium hydroxide and a small amount of water; the amount of water to be used depending on the water content of the crude material to be treated. It is desirable, however, that the saponifying mixture shall contain about 40% by weight of alcohol in the resulting mixture. Either methyl or ethyl alcohol may be used, and also, any suitable denatured alcohol. In hot alcohol ergosterol is soluble to an extent of about 32 parts per 500 parts, whereas, when cooled to about 8–10° C., the solubility is only about 1 part per 500 parts. In the solution containing about 40% by weight of alcohol, as is given in the specific example, the solubility of the sterols is approximately 3 parts per 500 parts when hot and not more than 0.2 parts per 500 parts when cooled.

A more specific example of the manner in which the present invention may be utilized in connection with obtaining sterols, particularly ergosterol, from compressed yeast is as follows: 100 grams of compressed yeast (containing about 70% of water) are mixed thoroughly with a solution such as would be obtained by mixing 100 cc. of 95% alcohol with 20 grams of caustic alkali, such as sodium or potassium hydroxide (NaOH or KOH) and about 20–25 cc. of water. The mixture is refluxed about two to four hours until the yeast cells are broken up and the fat is saponified. The hot alcoholic solution which contains the dissolved ergosterol is decanted from the yeast residue and filtered. Even during this procedure some of the ergosterol may crystallize from the cooling solution and will be filtered out. This precipitate is saved. The filtrate is then chilled to about 10° C., and, on cooling, further amounts of ergosterol will crystallize out. These crystals are filtered off and saved. This second filtrate may then be put back into the refluxing apparatus with the yeast residue and the mixture is again refluxed, whereby the residue is further re-extracted, whereupon the procedure of decanting, filtering and chilling is again followed. If desired, the entire procedure may be repeated a third time. After decanting the third time the yeast residue may be filtered as dry as is possible, and the filtrate is combined with the decanted liquid, which, after chilling and filtering, may be distilled to recover the alcohol.

Although by this procedure the larger proportion of the sterol content of the yeast is obtained, if desired the yeast residue may be further extracted with a suitable solvent, such as ether, chloroform or the like, to recover any traces of sterol remaining in the residue. From this extract the solvent may be evaporated and the ergosterol and accompanying sterols combined with the previously recovered portions.

The sterol composite may contain some of the soaps which are thrown out of solution by the cooling, and these may be eliminated by washing the composite with hot water, in which the soaps are soluble, but the ergosterol is insoluble. The washed material may then be further purified by taking up in, and crystallizing from, alcohol containing some water if desired, and by treating with acetone or cadmium chloride to precipitate other impurities which can be removed by filtration. Thereby the sterols may be obtained in relatively pure form.

We have also found that during any one of the chilling operations the separation of the sterol crystals may be expedited by bubbling a slow stream of air therethrough, which gently agitates the saponification liquor.

Having described our invention, what we claim as new and desire to secure by Letters Patent is:

1. A process of obtaining ergosterol from compressed yeast, which comprises heating the yeast with an alcoholic solution of caustic alkali containing about 40% by weight of alcohol, after the treatment separating the saponifying liquid while hot, cooling the separated liquid, whereby the sterols are crystallized out, and removing the crystallized sterols.

2. A process of obtaining sterols from compressed yeast, which comprises heating the yeast with an alcoholic solution of caustic alkali in which the sterols are relatively soluble when hot and relatively insoluble when cold, separating the saponifying liquid while hot, cooling the separated liquid, whereby the sterols are crystallized out, and removing the crystallized sterols; the materials used being present in approximately the ratio of 100 grams of compressed yeast, 100 cc. of 95% alcohol, 20 grams of caustic alkali, and 20–25 cc. of water, and the mixture being refluxed about two to four hours prior to the separation of the saponifying liquid.

3. A process of obtaining sterols from compressed yeast, which comprises heating the yeast with an alcoholic solution of caustic alkali in which the sterols are relatively soluble when hot and relatively insoluble when cold, separating the saponifying liquid while hot, cooling the separated liquid, whereby the sterols are crystallized out, and removing the crystallized sterols; the materials used being present in approximately the ratio of 100 grams of compressed yeast, 100 cc. of 95% alcohol, 20 grams of caustic alkali, and 20–25 cc. of water, and the mixture being refluxed about two to four hours prior to the separation of the saponifying liquid; and air being bubbled through the sterol-containing solution during the cooling step.

4. A process of obtaining sterols from crude substances containing the same, which comprises saponifying the substance in a saponifying liquid comprising a solution of a saponifying agent in a liquid in which sterols are relatively soluble when hot, and relatively insoluble and from which they crystallize out when cool, cooling the mixture, and removing the crystallized sterols therefrom; the character of the said liquid being such that the crystallized sterols are raised toward and will be held at the surface thereof during the cooling step by bubbling a slow stream of air therethrough.

5. A process of obtaining sterols from crude substances containing the same, which comprises saponifying the substance in an alcohol-water solution of caustic alkali having a density of about 0.99 sp. gr. and in which sterols are soluble up to about 3 parts per 500 parts while hot and approximately 0.2 part per 500 parts and from which they crystallize out when cooled to 8–10° C., cooling the mixture while bubbling air therethrough, and separating the crystallized sterols.

6. A process of obtaining sterols from crude substances containing the same, which comprises preparing a saponifying liquid having a density of about 0.99 sp. gr. by dissolving a saponifying agent in a liquid in which sterols are relatively soluble when hot and relatively insoluble and from which they crystallize out when cool, saponifying the substance in the saponifying liquid, cooling the mixture while bubbling air therethrough whereby the sterols are crystallized and rise to the top, and removing the crystallized sterols therefrom.

7. A process of obtaining sterols from yeast, which comprises saponifying the yeast in a saponifying liquid comprising a solution of a saponifying agent in a liquid in which sterols are relatively soluble when hot and relatively insoluble and from which they crystallize out and rise toward the surface when cool, separating the liquid while hot from the yeast, cooling the liquid while gently agitating, and removing the crystallized sterols therefrom.

8. A process of obtaining sterols from yeast, which comprises saponifying the yeast in a saponifying liquid comprising a solution of a saponifying agent in a liquid in which sterols are relatively soluble when hot and relatively insoluble and from which they crystallize out when cool; the character of the saponifying liquid being such that the yeast sinks to the bottom thereof and that the crystallized sterols are raised toward and will be held at the surface thereof during the cooling step during gentle agitation; after saponification decanting the liquid while hot from the yeast, cooling the liquid while gently agitating, and removing the crystallized sterols therefrom.

9. A process of obtaining sterols from yeast, which comprises saponifying the yeast in a saponifying liquid comprising a solution of a saponifying agent and a liquid in which sterols are relatively soluble when hot and relatively insoluble and from which they crystallize out when cool, the character of the saponifying liquid being such that the yeast sinks to the bottom thereof and that the crystallized sterols are raised toward and will be held at the surface thereof during the cooling step by bubbling a slow stream of air therethrough; after saponification decanting the liquid while hot from the yeast, cooling the liquid while gently agitating, removing the crystallized sterols therefrom, thereafter again admixing the liquid with the yeast, heating, cooling the mixture while blowing a slow stream of air therethrough, and removing the second crop of crystallized sterols therefrom.

10. A process of obtaining sterols from yeast, which comprises saponifying the yeast in a saponifying liquid comprising a solution of a saponifying agent and a liquid in which sterols are relatively soluble when hot and relatively insoluble and from which they crystallize out when cool, the character of the liquid being such that the yeast sinks to the bottom thereof and that the crystallized sterols are raised toward and will be held at the surface thereof during the cooling step during gentle agitation; after saponification decanting the saponifying liquid while hot from the yeast, cooling the liquid while gently agitating, removing the crystallized sterols therefrom, thereafter again admixing the liquid with the yeast, heating, again decanting the liquid from the yeast, cooling the liquid while blowing a slow stream of air therethrough, and removing the second crop of crystallized sterols therefrom.

11. A process of obtaining sterols from crude substances containing the same, which comprises saponifying the substance in an alcohol-water solution of caustic alkali, in which sterols are soluble up to about 3 parts per 500 parts while hot and approximately 0.2 part per 500 parts and from which they crystallize out when cooled to 8–10° C., and in which they are raised toward and will be held at the surface when the liquid is cooled and gently agitated, separating the saponifying liquid while hot, cooling the liquid while gently agitating, and removing the crystallized sterols.

12. A process of obtaining sterols from crude substances containing the same, which comprises saponifying the substance with an alcoholic solution of caustic alkali in which the sterols are relatively soluble when hot, and relatively insoluble and from which they crystallize out when cool, separating the saponifying liquid while hot, cooling the separated liquid while agitating by bubbling air therethrough whereby the sterols are crystallized out, and removing the crystallized sterols.

13. A process of obtaining sterols from crude substances containing the same which comprises saponifying the substance with an alcohol-water solution of caustic alkali containing about 40% by weight of alcohol and in which the sterols are relatively soluble when hot and relatively insoluble and from which they crystallize out when cool, separating the saponifying liquid while hot, cooling the separated liquid whereby the sterols are crystallized out, and removing the crystallized sterols.

14. A process of obtaining sterols from crude substances containing the same, which comprises saponifying the substance in a saponifying liquid comprising a solution of a saponifying agent in a liquid in which sterols are relatively soluble when hot and relatively insoluble and from which they crystallize out when cool, cooling the mixture by agitating by bubbling air therethrough, and removing the crystallized sterols therefrom.

15. A process of obtaining sterols from crude substances containing the same, which comprises preparing a saponifying liquid of about 0.99 specific gravity by dissolving a saponifying agent in a liquid which does not wet the surface of crystallized sterols when in contact therewith and in which sterols are relatively soluble when hot and relatively insoluble and from which they crystallize out and rise toward the surface when cool, saponifying the substance in the saponifying liquid, cooling the mixture while gently agitating, and removing the crystallized sterols therefrom.

16. The process of obtaining sterols from yeast, which comprises saponifying the yeast in a saponifying liquid comprising a solution of a saponifying agent in a liquid in which sterols are relatively soluble when hot and relatively insoluble and from which they crystallize out and rise toward the surface when cool, cooling the saponified mixture whereby the sterols are crystallized out, and removing the crystallized sterols therefrom.

In testimony whereof we affix our signatures.

CHARLES N. FREY.
ROBERT F. LIGHT.